Aug. 9, 1955  H. C. LESTER ET AL  2,714,963
APPARATUS FOR INJECTING A LIQUID INTO A FLUID STREAM
Filed Dec. 6, 1951  2 Sheets-Sheet 1

INVENTOR.
HERBERT C. LESTER &
ALFRED H. McKINNEY
BY
Busser + Smith
ATTORNEYS

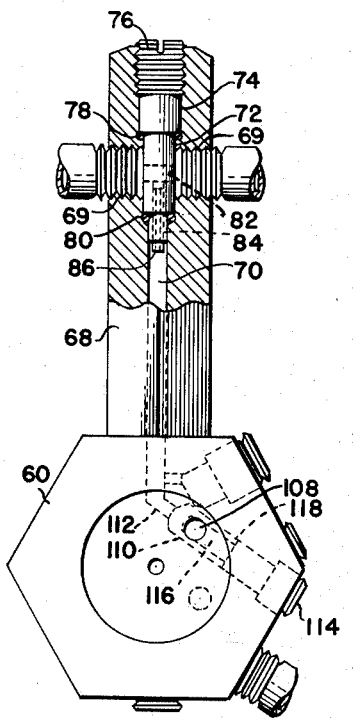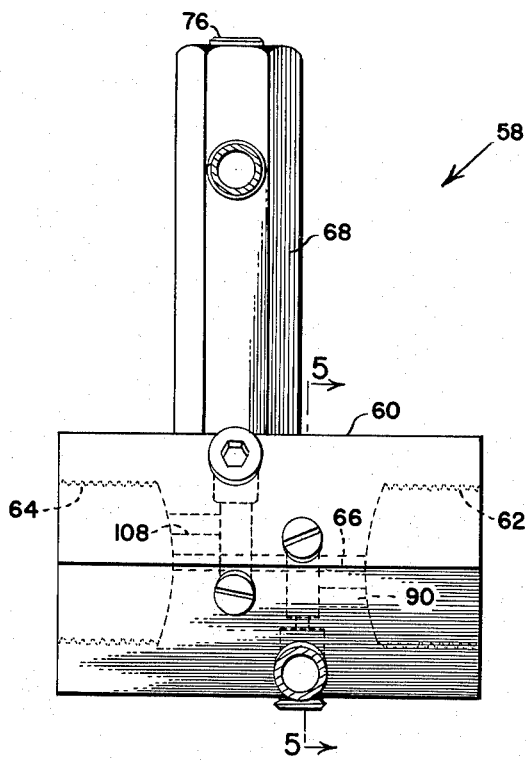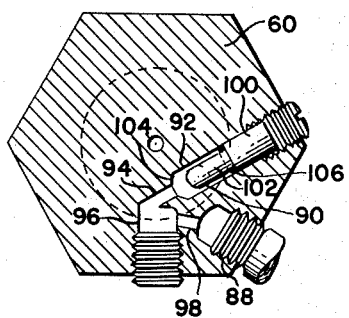
FIG. 4.
FIG. 3.
FIG. 5.
INVENTOR.
HERBERT C. LESTER &
ALFRED H. McKINNEY
BY
ATTORNEYS

United States Patent Office 2,714,963
Patented Aug. 9, 1955

2,714,963

APPARATUS FOR INJECTING A LIQUID INTO A FLUID STREAM

Herbert C. Lester and Alfred H. McKinney, Chester, Pa.

Application December 6, 1951, Serial No. 260,212

5 Claims. (Cl. 210—31)

This invention relates to apparatus for preventing corrosion in water pipes.

It is common experience that water lines are subject to interior corrosion. The effect of this is to restrict the water lines, produce rusty or stained water at intervals, and necessitate replacement of pipes which have been seriously affected in this manner.

It is a well known practice to add minute quantities of sodium silicate to water to prevent corrosion of the pipes. The sodium silicate added to the water forms a silicate coating or film on the interior walls of pipes, probably due to an adsorption action. The composition of this film depends upon the metal from which the pipes are made. Heretofore it has been the practice to add approximately eight parts of silicate per million parts of water in order to produce the protective silicate film on the pipe and, after a period of approximately thirty to ninety days, the concentration of silicate is reduced to not less than approximately four parts of silicate per million parts of water which is generally the minimum concentration required to maintain the existence of the protective film. (As is usual, it will be understood that where parts per million are herein referred to, $SiO_2$ content is meant.)

It has been the general practice that these concentrations of a silicate are added to the water flowing in a pipe line by means of a bypass placed across a restriction in the pipe line. The bypass includes a reservoir which is partially filled with a silicate solution and has a volume of water overlying the silicate solution. The bypass water flow is fed into and carried out of this overlying body of water and sufficient silicate is diffused into this moving body of water that reasonable control of the amount of silicate solution carried away by the water flow can be obtained when the amount of silicate added to the main water line is of the order of four to eight parts per million. This method, however, is highly unreliable when employed to add greater concentrations of silicate to the main water flow. It will be evident that any appreciable degree of turbulence existing within the body of water overlying the silicate solution in the reservoir will give rise to irregularities in the concentration of silicate carried out of the reservoir by the water flow.

As previously mentioned, the minimum concentration of silicate in the water stream, to maintain the corrosion preventive silicate coating, is of the order of four parts per million. When considerably greater concentrations of silicate are added to the water stream, there is obtained in effective water softening without actual precipitation of calcium or magnesium salts and, in extremely hard waters, phosphates or polyphosphates may be added to the silicate solutions to further this water softening effect. For normal hardness, however, the silicate itself is sufficient to produce desirable results if the silicate concentrations are raised sufficiently high. Suitable concentrations to provide these results are of the order of fifteen to sixty parts per million. Concentrations of over one hundred parts per million are undesirable, however, in that this concentration represents approximately the lower limit where in water of almost any pH value usually encountered the sodium oxide in the solution will affect foods, for example, give rise to the discoloration of some vegetables and produce cloudiness in tea, or will be noticeable by taste. Therefore, the addition of approximately fifteen to sixty parts of silicate per million parts of water will, without having any adverse effects and in addition to preventing corrosion, be effective to produce a softening of the water. As previously mentioned, however, the diffusion system of injecting silicate solutions in these concentrations is unsatisfactory due to the loss of control which occurs as a result of the increased turbulence occurring within the silicate reservoir with the increased flow of water required to carry off the necessary quantity of the silicate solution.

It is, therefore, an object of this invention to provide apparatus for injecting concentrated silicate solutions into pipes carrying water. While sodium silicate is the commercially practical silicate generally used, it will be understood that potassium silicate may be used if desired.

The invention contemplates the addition of silicate solution to a water flow by means of a reservoir tank which is partly filled with a silicate solution which is drawn from the tank below the level of the silicate solution through a capillary to a water line. The space above the silicate solution is filled with water. A suitable silicate solution, such as one having one poise viscosity, has a viscosity of approximately one hundred times that of water and, with the low rate of flow of water into the reservoir replacing the silicate solution withdrawn therefrom, there is substantially no agitation within the reservoir and, while some of the silicate goes into the overlying water, only very little of the water goes into the underlying silicate. The effective result is, therefore, a substantial immiscibility of the two liquids, the water remaining above and the silicate solution remaining below. Thus silicate solution of substantially unchanged concentration may be supplied to the water line in quantities, such as to produce a concentration of the order of fifteen to sixty parts of silicate per million parts of water in the water line, while water from the water line may be employed to replace the silicate solution drawn from the storage tank.

These and other objects of the invention are more fully set forth in the following description which is directed to the accompanying drawings, in which:

Figure 3 is an elevation of the physical embodiment of a portion of the apparatus shown schematically in Figures 1 and 2;

Figure 4 is a partially cut-away end elevation of the apparatus shown in Figure 3; and Figure 5 is a transverse section taken on the trace 5—5 of Figure 3.

Figure 1:
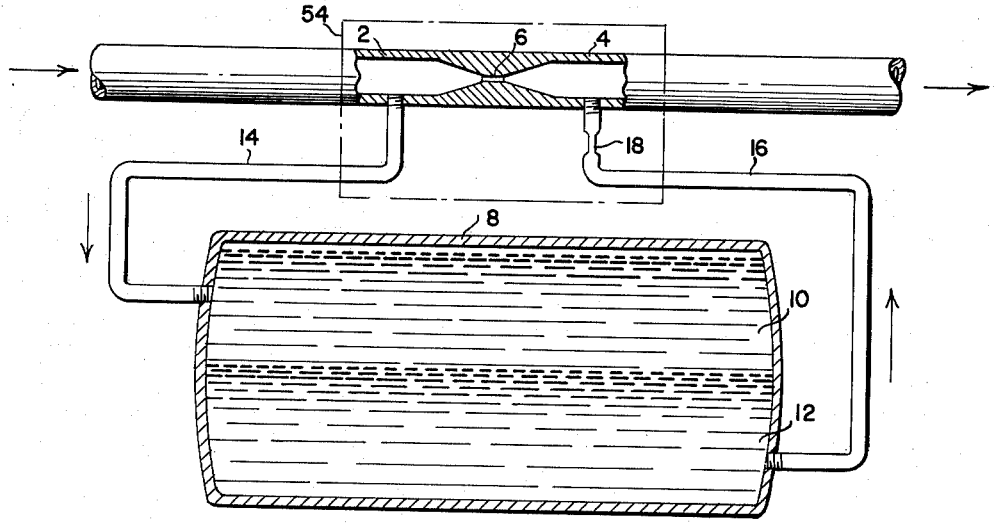
Figure 1 is a schematic representation of the basic form of the invention adapted for use in relatively small systems.

Referring to Figure 1 there is shown a water line having an inlet end 2, a discharge end 4 and an orifice 6 positioned between the inlet and outlet ends. The water line 2—4 may be a water supply line or a bypass across a restriction in a water supply line. A reservoir 8, which in practice is suspended immediately below the lines 2 and 4, is partially filled with a silicate solution as indicated at 12. This solution may be either sodium or potassium silicate and may be of approximately one poise viscosity. The space within the reservoir 8 above the silicate solution is filled with water as indicated at 10.

A pipe line 14 is connected between the water line on the upstream side of the orifice 6 and the upper portion, i. e., the water-containing portion, of the reservoir 8. A pipe line 16 is connected between the water line on the downstream side of the orifice 6 and the lower portion, i. e., the silicate containing portion, of the reservoir 8. A restriction 18 is provided in the pipe line 16 and is such as to establish viscous flow.

It will be evident that the difference in pressure existing across the orifice 6 will cause a flow of water from pipe line 2 through pipe line 14 into the reservoir 8 and a flow of silicate solution from the reservoir 8 through pipe line 16 and the restriction 18 into pipe line 4. This rate of flow is such as to supply to the water line 2—4, or to the main water supply line if the line 2—4 is a bypass line, silicate to produce concentrations above fifteen parts per million parts of water and below sixty parts of silicate per million parts of water as previously described, though if desired smaller or greater amounts of silicate may be introduced.

In this arrangement, the pressure drop across the orifice 6 for turbulent flow is given by:

$$h = K_1 V_1^2$$

where:

$h$ is the pressure drop across the orifice 6
$K_1$ is a constant and
$V_1$ is the velocity of the water flow through the orifice.

If $h$ is the pressure across the orifice 6, then the flow of silicate through the restriction 18, will be, since the flow is viscous $$V_2 = K_2 h$$

Then $$V_2 = K_1 K_2 V_1^2$$

It will be evident that the quantity of water flowing through the water line 2—4 is proportional to $V_1$, whereas, the quantity of silicate entering this water is proportionate to $V_2$. In this type of system, therefore, the dosage of silicate, i. e., the quantity of silicate per unit quantity of water, is proportionate to the flow of water.

The foregoing analysis assumes that the silicate solution level does not appreciably change and that the difference in specific gravity between the silicate solution in line 16 and water in line 14 has negligible effect due to small differences in level between the water line and the silicate supply tank. When the rate of flow of water is constant, such as in a pump system where the water is being pumped into a storage tank at a constant rate, the silicate dosage will be constant, but where the flow of water through pipe line 2—4 is variable, the silicate dosage will also be variable. However, by properly selecting the restriction 18 and determining the maximum anticipated flow rate, the maximum silicate dosage can be limited to a value below a maximum concentration as is determined by the previously mentioned effects on foods, and satisfactory results will be obtained.

There are certain disadvantages, however, to this type of system. The first of these disadvantages is involved in the physical limitations requiring the reservoir 8 to be hung immediately below the water line 2—4. While this type of installation is satisfactory in small systems to which there may be fed only two gallons of silicate solution per year, in larger systems, for example, where the flow of silicate solution would be of the order of a gallon of solution per day, it will be evident that the storage chamber will be of such size that it must be displaced a substantial distance from the water line. A further disadvantage of the system shown in Figure 1 is that a reversal of pressure drop across the orifice 6 will give rise to a reverse flow through pipe line 16. Such a reverse flow will invariably result in clogging of the restriction 18 by solid matter which is carried by the water flowing through the water line 2—4. (It may be noted that solid matter entering the tank at 14 will usually float in the silicate solution in the tank 8 and hence will not reach the restriction 18.)

Figure 2:
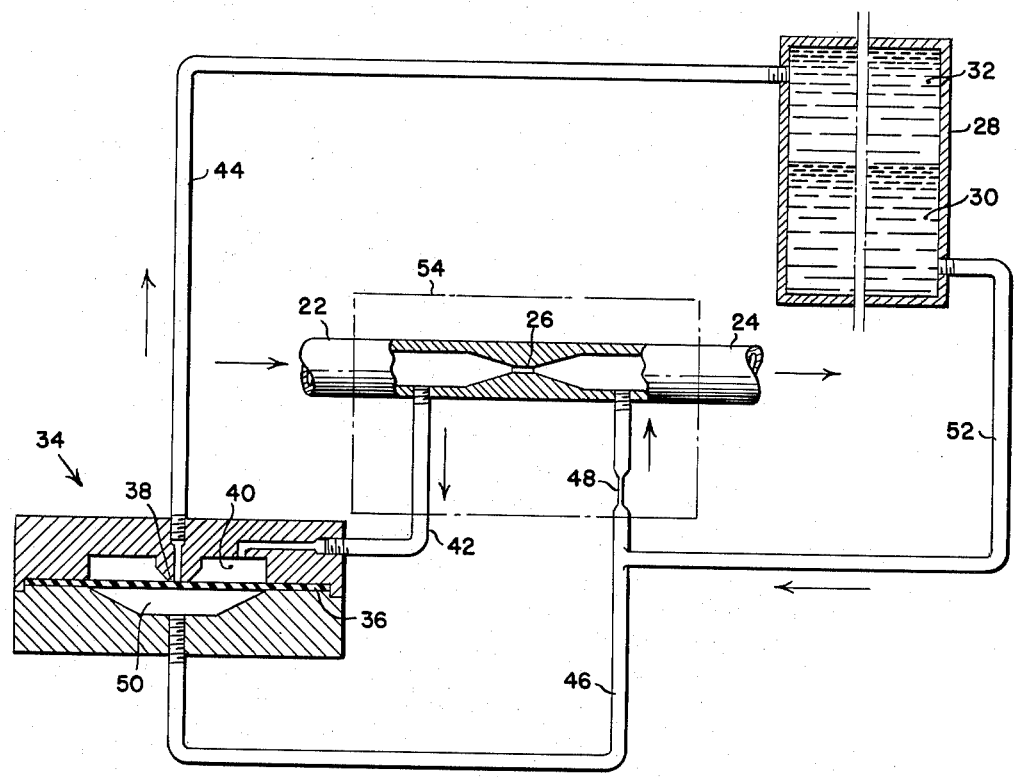
Figure 2 is a schematic representation of an improved form of the invention particularly adapted for use in larger systems.

The apparatus shown in Figure 2 overcomes these difficulties and provides various other desirable features. This apparatus includes a water line having an inlet portion 22, an outlet portion 24 and an orifice 26 positioned between the inlet and outlet portions. Displaced from the water supply line 22—24 is a storage vessel 28 which contains a layer of silicate solution 30 and an overlying layer of water 32. There is shown generally at 34 a pressure controller which includes a diaphragm 36 mounted within a chamber 40 which is adapted to close against an orifice 38. Connected between the upstream side of the orifice 26 and the chamber 40 in the pressure controller is a pipe line 42. A pipe line 44 is connected between the orifice 38 and the upper portion, i. e., the water containing portion, of the reservoir 28. A pipe line 46 is connected between the downstream side of the orifice 26 and a chamber 50 below the diaphragm 36 in the pressure controller. One end of a pipe 52 is connected to the pipe line 46 between a restriction 48 and the pressure controller, the other end of the pipe line 52 is connected to the lower portion of the reservoir 28, i. e., the silicate-containing portion and the other end of the restriction 48 is connected to the water outlet line 24.

A typical physical embodiment of the portion of the apparatus of Figures 1 and 2, shown within the construction line outlines 54, is shown in Figure 3 as indicated generally by the numeral 58. A hexagonal fitting 60 is adapted to receive within the thread bore 62 a water supply line such as pipe 22 shown in Figure 2, and is adapted to receive within a threaded bore 64 a water outlet line such as 24 shown in Figure 2. Connecting the threaded bores 62 and 64 is a bore 66 corresponding to the orifice 26 shown in Figure 2. Attached to the hexagonal fitting 60 is an upwardly extending stem 68 which contains an interior bore 70 having enlarged sections 72 and 74 at its upper end adapted to receive a restriction holder 76. O rings 78 and 80 are provided to prevent leakage between the restriction holder and the walls of the bores within the stem 68. The restriction holder is provided with a transverse bore 82 and an axial bore 84 in communication therewith and extending axially downwardly therefrom, and communicating with the bore 70 in the stem 68. Mounted within the bore 84 is a restriction orifice member 86. This restriction orifice member is preferably formed of tubing, such as stainless steel hypodermic needle tubing or a similar tubing selected to provide an orifice of suitable, usually minute, diameter. Alternately, the bore 84 may itself provide the orifice. The orifice provided by the tube 86, as shown in Figure 4, provides the restriction indicated as restriction 48 in Figure 2. The stem 68 is provided with the transverse bores 69 which communicate with the bore 82 in the restriction holder and are threaded to provide for connection of lines such as pipe lines 52 and 46 shown in Figure 2.

The bore 62 in the upstream side of the member 60 communicates with a threaded bore 88 by means of a port 90 and the bores 92, 94, 96 and 98. The threaded bore 88 is adapted to receive a connecting line, such as the pipe line 42 in Figure 2, which will conduct water and water pressure from the upstream side of the orifice 66 to a pressure controller, such as the controller shown at 34 in Figure 2. The bore 92 is threaded to receive a valve member 100 which has a reduced diameter end 102 adapted to engage a shoulder 104 to block the flow between the port 90 and the bore 94 when the member 100 is screwed inwardly to its fullest extent. An O ring 106 is provided to prevent the flow of liquid outwardly between the valve 100 and the wall of the bore 92.

The bore 70 in the stem 68 communicates with the bore 64 in the downstream side of the member 60 by means of a port 108 and bores 110 and 112. The bore 110 is partially threaded to receive a valve member 114 which has a reduced diameter end portion 116 which is adapted to close off communication between the bore 112 and the port 108 when the member 114 is screwed inwardly in the bore 110. An O ring 118 is provided to prevent leakage of fluids outwardly between the valve 114 and the wall of the bore 110.

In operation, the form of the invention shown in Figure 2, which may embody the structure shown in Figures 3, 4 and 5, may now be described. The pressure controller 34 is so constructed that, when the pressure in the chambers 40 and 50 is equal, the diaphragm 36 is effective to seal off the orifice 38 and to prevent the flow of liquid between the chamber 40 and the pipe line 44. Any reduction of pressure in the chamber 50, below the pressure of the chamber 40, will cause the diaphragm to be displaced, opening the port 38 and permitting a flow of liquid between the chamber 40 and the line 44. Flow through the line 44 will give rise to an increasing pressure in the reservoir 28, in the pipe line 52, in the pipe line 46 and in the chamber 50. This condition of increasing pressure will continue until the pressure in the chamber 50 equals the pressure in the chamber 40 at which time the diaphragm 36 closes the orifice 38 and flow through the line 44 is terminated.

Flow of water through the line 22—24 will give rise to a pressure drop across the orifice 26. The pressure delivered to chamber 40 through pipe line 42 will be the pressure on the upstream side of the orifice 26. The pressure giving rise to a flow of liquid, silicate solution, through the orifice 48 is the difference in pressure between the pressure on the downstream side of the orifice 26 and the pressure in the line 52. From the foregoing, it will be evident that the action of the pressure controller is to maintain the pressure in the lines 52 and 46 equal to the pressure on the upstream side of the orifice 26. Thus there will be maintained across the orifice 48 a pressure drop substantially equal to the pressure drop across the orifice 26. Under these conditions, the silicate reservoir 28 may be located in any convenient position and the rate of flow of silicate solution into the water line 24 will depend upon the pressure across the orifice 48, as is determined by the orifice 26, and the flow therethrough, and the diameter of the orifice 48.

In this form of the invention a termination of flow of water through pipe line 22—24 or a reversal of water flow therethrough will immediately close off the orifice 38 in the pressure controller and terminate or prevent flow of liquid through the orifice 48. Upon resumption of flow in the normal direction through the water line 22—24, silicate solution is immediately available through the orifice 48 for delivery into the water system.

In the form of the invention shown in Figure 1 there will occur some variation in dosage as a result of the lowering of the level of silicate in the reservoir 8. The arrangement shown in Figure 2 avoids this variation in that, as has been previously described, the pressure controller maintains a pressure across the restriction 48 which is substantially equal to the pressure drop across the orifice 26. Thus, while in the form of the invention shown in Figure 2 there occurs a variation in dosage for varying flow rates through the water line 22—24, the dosage for any particular water flow will at all times remain constant regardless of the level of silicate solution within the reservoir.

It will be evident that this invention provides a simple and practical apparatus for providing an injection of relatively minute quantities of a silicate solution into pipe lines carrying water in order to prevent corrosion from occurring within the pipe lines. In small systems, the silicate feed rate may be as low as two gallons per year. The invention provides for the injection of silicate solution at varying rates responsive to the rate of flow of water through the pipe and while, as described above, te dosage is not constant for all water flow rates, the range of permissible dosage is such that the apparatus provides the injection of sufficient, but not excessive, quantities of silicate solution into the water lines over the normal range of water flow rate carried by those lines. Due to the high specific gravity of the silicate solution, sludge accumulating in the silicate storage tank will accumulate at the surface of the silicate solution. Thus particles which could plug the silicate orifice will never reach the orifice.

In very small systems, the arrangement shown in Figure 1 may be modified by positioning the connection between pipe line 16 and the reservoir 8 in the upper region of the reservoir containing the water as indicated at 10. There will be sufficient diffusion of the silicate solution into the water to provide a sufficient quantity of silicate in the line 16 such that, with proper control by the orifice 18, the proper dosage will be supplied to the water in conduit 4. In both this form of apparatus and in the form of the apparatus shown in Figure 1, this controlling orifice, 18 in Figure 1, carries treated water and thus cannot be effected by corrosion which would otherwise result. It is noted that some waters are so corrosive that even stainless steel is sufficiently effected that a small orifice such as this, even though formed from stainless steel, will be restricted as a result of corrosion.

It will be evident that various modifications may be made in the embodiment of the invention as disclosed herein without departing from the scope of the invention as set forth in the following claims.

What is claimed is:

1. Apparatus for injecting a liquid material into a liquid stream in a conduit comprising a fitting adapted to be inserted between ends of the conduit, the fitting including means providing an orifice through which the liquid stream in the conduit passes, connections to the liquid stream on each side of the orifice and removable means providing a restriction in the connection to the stream on the downstream side of the orifice, a storage vessel mounted immediately below the conduit and containing liquid material to be injected into the liquid stream, an unrestricted conduit extending between the connection in the fitting to the liquid stream on the upstream side of the orifice and the upper portion of the storage vessel adapted to be above the level of the liquid material therein to be injected into the liquid stream, a conduit extending between the connection in the fitting to the liquid stream on the downstream side of the orifice and the lower portion of the storage vessel adapted to be below the upper level and above the lower level of the liquid material therein to be injected into the stream, pressure drop across the orifice in the fitting in the liquid stream inducing a flow of liquid from the upstream side of the fitting through the fitting and the first mentioned conduit to the storage vessel and a flow of liquid material from the storage vessel through the second mentioned conduit and the restriction therein to the downstream side of the fitting.

2. Apparatus for injecting a liquid material into a liquid stream in a conduit comprising a fitting adapted to be inserted between ends of the conduit, the fitting including means providing an orifice through which the liquid stream in the conduit passes, passages connected to the liquid stream on each side of the orifice and removable means providing a restriction in the passage connected to the liquid stream on the downstream side of the orifice, a storage vessel mounted adjacent to the conduit and containing liquid material to be injected into the stream, a second conduit extending between the connection in the fitting to the liquid stream on the upstream side of the orifice and the storage vessel, a third conduit extending between the connection in the fitting to the liquid stream on the downstream side of the orifice and the storage vessel, and pressure responsive means for blocking the flow through the second conduit and passage connected to the liquid stream on the upstream side of the orifice, pressure drop across the orifice in the fitting in the liquid stream inducing a flow of liquid through the passage connected to the liquid stream on the upstream side of the orifice when the flow blocking means is open and through the first mentioned connection to the storage vessel and inducing a flow of liquid material from the storage vessel through the second mentioned connection, through the passage in the fitting connected to the liquid stream on the downstream side of the orifice and through the restriction therein to the downstream side of the fitting.

3. Apparatus for injecting a liquid material into a liquid stream in a conduit comprising means providing an orifice through which the liquid stream in the conduit passes, a storage vessel for liquid material to be injected into the stream, means connecting the conduit on the upstream side of the orifice and the storage vessel, means connecting the conduit on the downstream side of the orifice and the storage vessel, a restriction in the second mentioned connecting means for limiting the flow of liquid therethrough, and means in said first mentioned connecting means for controlling the pressure of the liquid in the storage vessel in response to the pressure drop across the orifice in the conduit.

4. Apparatus for injecting a liquid material into a liquid stream in a conduit comprising means providing an orifice through which the liquid stream in the conduit passes, a storage vessel containing liquid material to be injected into the stream, a pressure controller including a diaphragm, a first chamber adjacent to one side of said diaphragm, a second chamber adjacent to the other side of said diaphragm and means providing an orifice in the second chamber adapted to be restricted by the diaphragm when the pressure in the first chamber exceeds the pressure in the second chamber, a connection between the conduit on the upstream side of the orifice in the conduit and the second chamber in the pressure controller, a connection between the conduit on the downstream side of the orifice in the conduit and the first chamber in the pressure controller, a restriction in the second mentioned connection for limiting flow of liquid therethrough, a connection between the orifice in the pressure controller and the storage vessel, and a connection between the storage vessel and the second mentioned connection between the restriction therein and the pressure controller, the pressure controller acting in response to pressure drop across the orifice in the conduit to control the pressure of the liquid in the storage tank in response to the pressure drop across the orifice in the conduit thus controlling the flow of liquid from the storage tank through the restriction and into the liquid stream, the storage tank being substantially completely filled with liquid.

5. Apparatus for injecting a liquid material into a liquid stream in a conduit comprising an orifice through which the liquid stream in the conduit passes, a storage vessel containing liquid material to be injected into the stream, the liquid material being of greater specific gravity than the liquid in the conduit and, in the absence of agitation, being substantially immiscible therewith, a pressure controller including a diaphragm, a first chamber adjacent to one side of said diaphragm, a second chamber adjacent to the other side of said diaphragm and an orifice in the second chamber adapted to be closed by the diaphragm when the pressure in the first chamber exceeds the pressure in the second chamber, a connection between the conduit on the upstream side of the orifice in the conduit and the second chamber in the pressure controller, a connection between the conduit on the downstream side of the orifice in the conduit and the first chamber in the pressure controller, a restriction in the second mentioned connection for limiting flow of liquid material therethrough, a connection between the orifice in the pressure controller and the storage vessel, and a connection between the storage vessel and the second mentioned connection between the restriction therein and the pressure controller, the pressure controller acting in response to pressure drop across the orifice in the conduit to control a pressure drop across the restriction in the second mentioned connection in response to the pressure drop across the orifice in the conduit thus controlling the flow of liquid material from the storage tank through the restriction and into the liquid stream.

References Cited in the file of this patent

UNITED STATES PATENTS

| | | |
|---|---|---|
| 569,440 | West | Oct. 13, 1896 |
| 1,085,348 | Ledoux | Jan. 27, 1914 |
| 1,796,407 | Shuldener | Mar. 17, 1931 |
| 1,855,323 | Sirch | Apr. 26, 1932 |
| 1,897,492 | Ledoux | Feb. 14, 1933 |
| 2,137,755 | Glynn | Nov. 22, 1938 |
| 2,233,467 | Bachman | Mar. 4, 1941 |
| 2,563,211 | Cassese | Aug. 7, 1951 |
| 2,594,519 | Thurber et al. | Apr. 29, 1952 |
| 2,618,510 | Mills | Nov. 18, 1952 |

FOREIGN PATENTS

| | | |
|---|---|---|
| 356,796 | Great Britain | Sept. 10, 1931 |
| 323,415 | Germany | Oct. 24, 1918 |